(12) United States Patent
Schnorbus et al.

(10) Patent No.: US 7,806,100 B2
(45) Date of Patent: Oct. 5, 2010

(54) INJECTION METHOD AND ASSOCIATED INTERNAL COMBUSTION ENGINE

(75) Inventors: Thorsten Schnorbus, Aachen (DE); Matthias Lamping, Aachen (DE)

(73) Assignee: Fev Motorentechnik GmbH, Aachen (DE)

(*) Notice: Subject to any disclaimer, the term of this patent is extended or adjusted under 35 U.S.C. 154(b) by 0 days.

(21) Appl. No.: 12/241,611

(22) Filed: Sep. 30, 2008

(65) Prior Publication Data

US 2009/0093947 A1    Apr. 9, 2009

Related U.S. Application Data

(63) Continuation of application No. PCT/EP2007/002195, filed on Mar. 13, 2007.

(51) Int. Cl.
*F02B 3/00* (2006.01)
*F02B 3/04* (2006.01)

(52) U.S. Cl. ........................ 123/299; 123/435

(58) Field of Classification Search ............. 123/435, 123/299, 300, 304, 295, 430, 301; 701/103, 701/104
See application file for complete search history.

(56) References Cited

U.S. PATENT DOCUMENTS

| | | | |
|---|---|---|---|
| 3,699,935 A * | 10/1972 | Adler et al. | 123/357 |
| 6,062,193 A * | 5/2000 | Gatellier | 123/299 |
| 6,711,945 B2 * | 3/2004 | Fuerhapter et al. | 73/114.01 |
| 6,722,345 B2 * | 4/2004 | Saeki et al. | 123/435 |
| 6,850,832 B1 | 2/2005 | Rodriguez et al. | |
| 6,935,304 B1 * | 8/2005 | Liu | 123/299 |
| 2002/0020388 A1 | 2/2002 | Wright et al. | |
| 2003/0061869 A1 | 4/2003 | Fuerhapter et al. | |
| 2005/0224044 A1 * | 10/2005 | Stojkovic et al. | 123/299 |

FOREIGN PATENT DOCUMENTS

| | | | |
|---|---|---|---|
| DE | 19749817 | A1 | 5/1999 |
| DE | 6960222 | T2 | 11/1999 |
| DE | 69401703570 | T2 | 11/1999 |
| DE | 10191818 | T | 2/2003 |
| DE | 10159017 | A1 | 6/2003 |
| DE | 69905684 | T2 | 10/2003 |
| DE | 69817806 | T2 | 7/2004 |
| DE | 102004001119 | A1 | 8/2005 |
| EP | 0 411 321 | A1 | 2/1991 |

(Continued)

OTHER PUBLICATIONS

International Search Report dated Jul. 12, 2007. PCT/EP2007/002195.

(Continued)

*Primary Examiner*—Mahmoud Gimie
(74) *Attorney, Agent, or Firm*—Gifford, Krass, Sprinkle, Anderson & Citkowski, P.C.

(57) ABSTRACT

In order to improve a combustion process of a motor vehicle, in particular with regard to emissions and/or the development of noise, a method for regulating an injection profile is provided, in which method a fuel is injected directly into a combustion chamber, wherein the regulation brings about a change in the injection profile (23) at least during a first work cycle on the basis of at least one parameter which is recorded during the first work cycle. Furthermore, a corresponding direct-injection internal combustion engine is provided.

19 Claims, 7 Drawing Sheets

FOREIGN PATENT DOCUMENTS

| | | |
|---|---|---|
| EP | 1 085 191 A2 | 3/2001 |
| EP | 1318288 A2 | 6/2003 |
| EP | 1403495 A2 | 3/2004 |
| EP | 1477615 A1 | 11/2004 |
| EP | 1617057 | 1/2006 |
| GB | 2 365 641 A | 2/2002 |
| WO | WO-94/18443 A1 | 8/1994 |
| WO | WO-96/41945 | 12/1996 |
| WO | WO-2005/005813 A | 1/2005 |
| WO | WO-2005/005813 A2 | 1/2005 |

OTHER PUBLICATIONS

Emissionsverbesserung an Dieselmotoren mit Direkteinspritzungmittels Einspritzverlaufsformung, Extract from MTZ Motortechnisch Zeitung 60, 1999, pp. 552-558.

* cited by examiner

INJECTION METHOD AND ASSOCIATED INTERNAL COMBUSTION ENGINE

CROSS-REFERENCE TO RELATED APPLICATIONS

This application claims priority to international patent application PCT/EP2007/002195 filed Mar. 13, 2007, which claims priority to German patent application DE 10 2006 015 503.3 filed Mar. 31, 2006.

FIELD OF THE INVENTION

The invention relates to a method for regulating an injection of an internal combustion engine, advantageously a direct-injection internal combustion engine of a motor vehicle, and also an associated internal combustion engine itself.

BACKGROUND OF THE INVENTION

Direct-injection internal combustion engines are very common, in particular, in the automotive field, and are subjected to ever increasing efforts in terms of emission characteristic, consumption, and noise development. In addition to a characteristic map-controlled injection of fuel, it is known, for example, from DE 197 498 17 A1 to determine the injection start and the combustion point from a difference between a measured pressure profile and a calculated pressure profile. In addition, it is known from WO 2005/005813 A2 to set a time point of the fuel injection by means of at least one injection event and/or an inert-gas percentage in a cylinder from a detected state parameter in the cylinder as the control parameter.

SUMMARY OF THE INVENTION

The problem of the present invention is to improve a combustion process, in particular, with respect to emissions characteristic and/or noise development.

In a method according to the invention for regulating an injection profile of, in particular, a direct-injection internal combustion engine of a vehicle, in which fuel is injected directly into a combustion chamber, it is provided that the regulation causes a change in the injection profile at least during a first work cycle on the basis of at least one parameter recorded during the first work cycle.

An injection profile can be changed, for example, to the extent that an injection rate is changed. It can also be provided that an injection time is changed. A wide range of different possibilities as to how the injection profile can be changed will be presented below. The possibilities presented here can be used individually as well as combined with each other and are not to be limited, in particular, in their combinations.

Advantageously, this allows the injection characteristic to be adapted in order to positively influence emissions and noises. In particular, the injection characteristic can be adapted in a non-steady way within an operating point. Advantageously, different injection quantities, which are induced due to production tolerances in the injection system, can be equalized. In addition, the method advantageously simplifies adaptation to other operating modes, such as, for example, regeneration of a diesel soot particle filter. Furthermore, advantageously a retarded 50% mass conversion point can be operated in a stable way. Preferably, it becomes possible to switch between various operating modes in a torque-neutral way.

According to one refinement, in the internal combustion engine of a vehicle, in which fuel is injected, regulation is provided, in which at least one first parameter in connection with a profile, in particular, a combustion profile, is determined during a first combustion cycle, a comparison of the first parameter with a given second parameter is performed, and by means of the comparison, in particular, by means of a deviation between the two parameters, the injection is changed. Advantageously, the given second parameter is determined as a function of at least the emission behavior, the fuel consumption, and the combustion noise.

Advantageously, the adaptation is performed in terms of time and/or quantity. Here, the time profile and also the volume flow of the injection itself can be changed. In addition to an injection profile or injection characteristic, for example, an optimized injection pressure, a rail pressure, a charge pressure, an intake pipe temperature, an exhaust gas temperature, an inert gas percentage, a charge movement into a cylinder, and/or a quantity of air is calculated and transmitted to appropriate control elements of the internal combustion engine. If individual complete cylinder pressure profiles or heating profiles are not available, individual characteristics and/or sections can also be used. This is explained in more detail farther below.

For example, the injection in a first combustion cycle can be changed as a function of the parameter recorded during the first combustion cycle. According to another refinement, it is provided that on the basis of the determined first parameter from the first combustion cycle, at least one injection of a subsequent combustion cycle is changed. This can be the directly following combustion cycle or also a later combustion cycle. Furthermore, it can be provided that the second parameter follows a load-dependent and rotational speed-dependent optimization. For example, for this purpose it can be provided that a desired profile for this second parameter was determined at least partially during a test run of the internal combustion engine and can be finalized by means of adaptive processes on correspondingly optimized values as DESIRED values.

At least one value generated for at least one first cylinder for the regulation of the injection is advantageously also used for at least one second cylinder. Here, from the setting it is assumed that at least one part of the cylinder of the internal combustion engine is operated uniformly and therefore the same operating conditions are at least approximately provided in each cylinder. These operating conditions can also deviate from each other according to the internal combustion engine. This can be generated, for example, through different cooling, through different control times, and also through different residual gas filling or through partial cylinder shutdown. For compensating different influencing factors there is the possibility of determining an average adaptation from the consideration of different cylinders and the generated adaptations, which average adaption can be used, in particular, also as a pilot control value for regulation of the following combustion cycle.

Advantageously, it is provided that the first and the second parameters are recorded as a parameter profile and are compared with each other. For example, a cylinder pressure is monitored, in order to obtain from this a parameter profile that is incorporated into the regulation and that causes a change in the injection. Also, only at least one section of a combustion profile could be referenced for determining the adaptation. For example, at least one section of a temperature profile, one section of a polytropic coefficient profile, and/or one section of a heating profile is referenced for determining the adaptation. Another construction provides that a value, which is increased or decreased for adapting a total injection quantity of the injection in a combustion cycle, is determined from a profile, in particular, from a cylinder pressure profile. It can also be provided that an average pressure is calculated from the cylinder pressure profile and used for further processing. For example, for adapting a total injection quantity, the average value can be calculated from the cylinder pressure profile and through its increase and decrease, the total injection quantity can approach a given value. Division of the total injection quantity is realized, for example, by setting the injection profile or the injection characteristics. Another construction provides that for determining the adaptation, a complete profile of the parameter is used. Advantageously, profile is here understood to be the time response of the parameter over the period of a combustion profile of a work cycle. One refinement considers the time profile of the parameter over an entire work cycle, in order to obtain the adaptation for the next combustion profile.

Advantageously, from one profile, one or more characteristic features are selected and used for adapting the injection, wherein the characteristic feature is selected from the group, which comprises at least: calculated average value, slope of a tangent, maximum, minimum, beginning, end, and/or time period each relative to the profile. Corresponding characteristics can be, for example, without being complete, a combustion start, a combustion time period, a combustion end, individual injection events, an average value of a combustion pressure, a value and/or a position of a maximum pressure increase, a maximum and/or minimum of the combustion, heating, and/or cylinder pressure profile, a position of the maximum and/or the minimum of the combustion, heating, and/or cylinder pressure profile, a position of an arbitrary mass conversion point of the combustion, the combustion position, the combustion noise, and/or the slope of a tangent at an arbitrary point of the combustion profile. For adaptation, preferably at least one mass flow, pressure, and/or temperature is changed relative to the internal combustion engine, advantageously relative to a special cylinder. In particular, by means of the adaptation, a change in injection pressure, rail pressure, charge pressure, intake pipe temperature, exhaust gas temperature, charge movement in a cylinder, and/or air quantity of the internal combustion engine can be achieved.

The adaptation advantageously uses an intervention in an injection characteristic. The term injection characteristic is understood to be a number, a distance, a type of injection such as one-hole or multiple-hole release, a beginning, an end, and/or a time period of pre-injection, boot injection, multiple injection, main injection and/or secondary injection.

For producing a desired profile of the first parameter, for example, the cylinder pressure profile or a desired combustion profile, several different values from the following group are changed and advantageously also adapted: for example, start, time period, end, type, number and time points of the various injection events, and also their appropriate rate, the injection pressure, in particular a rail pressure, a charge pressure, an air quantity, an inert gas component, and/or a charge movement in one of the cylinders, an intake pipe temperature and/or an exhaust gas temperature. Advantageously, values such as an injection rate or also a retarded injection are still influenced in the same cycle. However, according to one refinement, a pre-injection, a pre-injection quantity, a rail pressure, and also other values listed above are each adapted for the next cycle. In particular, if an adaptation of these values was still not possible in the prior cycle, these are adapted in the directly following cycle.

According to one refinement, it is provided that for those values that cannot be adapted during a current cycle, self-learning pre-control characteristic maps are stored. On one hand, these unburden a regulator. On the other hand, these contribute to stabilization of the system. In addition, a time gain is created, because on the basis of the learning effect, those values that otherwise only could be influenced for one or more following cycles, could be preset and optimized after multiple passage of a certain situation also already in the current cycle by an optimized pre-control.

As an example, three different possibilities will be presented below, none of which, however, is to be considered as restricting.

First, for the operation of a diesel particle filter in a regenerative mode, for a detected fault in the combustion of a pre-injection before a main injection, an additional pre-injection can take place in the same combustion cycle. This is used as an example for a change in an injection characteristic in the same cycle:

The internal combustion engine is in a regenerative mode and should generate a high exhaust gas temperature. For this purpose, a 50% mass conversion point of 30°KW [crankshaft angle] past OT [upper dead center] is required. The actual injection characteristic includes a pre-injection for 10°KW before OT and a main injection at 25° past OT. Now, for a deviation based on an inadequate combustion profile, it is recognized that the current conditions in one cylinder are not sufficient for a stable operation of a retarded 50% mass conversion point as provided. For solving this deficiency, the adaptation provides that the injection characteristic is immediately changed and a second pre-injection is performed shortly before the main injection, in order to stabilize a combustion profile of the main injection.

Second, if a fault in the combustion of a pre-injection is determined in a first cylinder, an adaptation performed for the first cylinder can also be used for a second cylinder, before the pre-injection takes place there. This is an example for a change in the injection characteristic for a subsequent cycle:

During a dynamic driving mode, it is determined that a pre-injection is not combusted by a first cylinder due to a rich mixture. For correction, the injection characteristic is changed until the pre-injection combusts again. Because the rich mixture also exists for a second cylinder in the ignition sequence, for the second cylinder a second pre-injection is performed before the prior pre-injection. This second pre-injection, which leads to combustion of the original pre-injection, is then maintained for all cylinders until the rich mixture no longer exists.

Third, an exhaust-gas recirculation rate can be determined and for adaptation, the injection pressure can be increased. This shows the example use for a change in a motor parameter:

Due to an error of the AGR [exhaust-gas recirculation] valve, the AGR rate increases in an undesired way. A combustion time period of a main injection is therefore lengthened in an undesired way. If this deviation from the DESIRED combustion time period is recognized by an evaluation of the cylinder pressure profile, the injection pressure is raised on the part of the adaptation, in order to minimize the deviation. Through the increased injection pressure, the fuel charge per degree crank angle increases and the combustion is thus accelerated. This increased injection pressure is maintained until it is recognized from the evaluation of the cylinder pressure profile that the injection pressure can be lowered again.

The internal combustion engine advantageously involves a combustion engine operating according to the Otto or diesel process. A diesel engine involves, in particular, a high-speed, direct-injection diesel engine or HSDI diesel engine. This allows, in particular, a formation of an injection-rate profile. Advantageously, the injection-rate profile can be set as a function of time.

The combustion cycle is to be understood as the time period of an individual cylinder in which an injection begins and combustion is completed, i.e., the combustion cycle lies within one work cycle, i.e., a cycle that extends, for a 4-stroke engine, over a crankshaft angle of 720°. For a 2-stroke engine, the work cycle extends, in particular, over a crankshaft angle of 360°. In particular, a regulation of the injection profile is performed on the basis of at least one section of a work cycle set between the closing of the inlet and the opening of the outlet. The adaptations provided in a work cycle below; like control actions, can run in a combustion cycle, and also in reverse.

According to one refinement, it is possible to be able to react within three strokes of a cycle, for example, with respect to a pre-injection and/or post-injection, regeneration of a filter, and therefore the necessary enrichment of an exhaust gas enrichment or the like. For example, regeneration of a particle filter, freeing of an $NO_x$ storage converter from stored $NO_x$ or $SO_x$, or converter heating can be taken into account. Advantageously, within one stroke a value is recorded, evaluated, and accordingly, still in the same stroke, the injection profile can be changed.

The parameter is determined, for example, from the pressure profile in the combustion chamber during at least one section of a cycle. For example, from the pressure profile, a combustion start in the combustion chamber is detected. Advantageously, the measured pressure profile is compared with a pressure profile calculated or measured in a following mode and a combustion start is determined from a deviation. Alternatively or additionally, a combustion function can be calculated with reference to the combustion start determined from the measured pressure profile.

For example, the adaption of a start injection with subsequent increasing injection rate is provided, so that for the detected start of the combustion, the injection rate increases with a ramp shape. At the end of the injection, the injection rate is advantageously set abruptly to zero. Advantageously, through an increase in the injection rate, at the combustion start, turbulence in the combustion chamber increases. In addition, through an abrupt injection end, advantageously good requirements for post-oxidation are created by a hot combustion end. The combustion start can be recognized, for example, by means of a pressure sensor, whereupon then a signal for changing the injection rate is generated by the control. Advantageously the optimum injection profile for operating points of high load can be set in a reproducible way. In particular, in the region of medium load, it can be advantageous to eliminate a start injection and/or a pre-injection, in order to achieve favorable emission values. In particular, in unsteady operation, a pre-injection can be provided for stabilizing the combustion or for noise optimization for a short time.

As an alternative or addition to a measurement of the combustion chamber pressure, a measurement parameter can be used from the group comprising temperature, ionic current, and output signal of an optical measurement principle.

Another construction provides that isobaric combustion can be set at least approximately. Here, it can be provided that a pressure of at least 10 bar $p_{mi}$ is present.

For regulation, for example, a PID control method, a fuzzy-control method, or the like is used. In particular, the regulation has a cycle time of a few microseconds. For example, the regulation of an injection ramp can be provided, whose start and end points are set with reference to at least one parameter recorded during the first cycle. In addition, other dependencies can be provided as a function of the one or more measured parameters. In particular, pulse lengths and intensities of an injection can be set.

According to one refinement, the parameter is coupled with a combustion profile and is determined during the first work cycle. The control parameter is selected, for example, from the group comprising pressure increase, peak pressure, ignition delay, peak pressure position, heat release, conversion rate, and 50% conversion point.

For example, a 50% conversion point of the combustion is determined from the combustion profile.

For regulating the injection profile, in addition to the parameter recorded during the first cycle, use can be made of the consideration of additional input parameters of the regulation. The additional input parameters can be selected, in particular, from the group comprising charge pressure, intake pipe temperature, injection quantity, injection characteristic, injection start, average pressure, angle sensor signal, and/or end stage output voltage. In addition, the lambda value and also an operating mode can be considered. Injection quantity and/or the injection characteristic can be set, for example, with reference to a characteristic map in connection with a driver requirement. In addition, an exhaust gas recirculation rate can also be considered.

In addition to the actual regulation of the injection profile, the one or more recorded parameters can be used for improving an equal setting for all cylinders with reference to the combustion profile. For example, with reference to an analysis of the measured average pressures, an injection profile can be dimensioned so that a deviation of a respective injection profile of the various cylinders is reduced relative to each other.

According to one refinement, it is provided that a post-injection in a first work cycle be changed as a function of the parameter recorded during the first work cycle. A post-injection is used, for example, for a regeneration of a diesel soot particle filter or, for example, for setting a rich operation. Advantageously, an adapted change to the post-injection and/or a main injection displaced in the "retarded" direction allows a homogeneous torque build-up. In particular, a variable injection characteristic with a variable number of pilot injections can be stabilized. Preferably, such an injection is selected for operation at a low engine load.

In one construction, an injection quantity regulation is performed during the first work cycle, which is at least based on at least the parameter recorded in the first work cycle, in particular, is triggered by this parameter. For example, the start point of a rising injection rate ramp can be tripped by the recognized combustion start. In addition, the determination of an amplitude factor for an injection rate profile from a combustion chamber pressure, in particular, from an average combustion chamber pressure can be provided, for example.

According to one variant, the changing of at least one injection profile of a subsequent cycle on the basis of the parameter determined from the first work cycle is additionally provided. For example, the determined control profile is assumed without additional regulation for the following cycles. This can be provided, for example, in order to consider, in a higher-order control loop with a larger time constant the dead times of an exhaust-gas recirculation control that are larger relative to an injection control. In addition, taking over of the slop of the injection rate ramp determined in the regulation for one or more following cycles can be provided. For this case, in these following cycles, for example, the injection start and the injection end can be set.

Furthermore, the use of an amplitude value from the first cycle for one or more following cycles can be provided.

According to one refinement, changing of the injection profile in the first and the directly following second work cycle by the regulation is provided. For example, the regulation begins in the first work cycle and is still effective in the second work cycle.

According to another refinement, at least one control signal generated for at least one first cylinder is used for a pre-control of a regulation of an injection profile of at least one second cylinder. Here, in particular, a control signal is determined in one work cycle of the second cylinder from a directly preceding work cycle of the first cylinder. For example, the pre-control performs an adaptation of the regulation of the injection profile of the second cylinder. An adaptation is especially preferred for variations or deviations in the combustion, which are caused, for example, by deviations in the charge pressure, the exhaust-gas recirculation rate, the charge air temperature, the engine temperature, or the like. Advantageously, through the pre-control, regulation effort is reduced. The pre-control performs an adaptation of the injection profile, in particular, as a function of existing deviations or variations in the operating state of the motor, for example, as a function of variations in the charge pressure. For an adaptation, it is provided, for example, that a variation in a parameter recorded during a work cycle is recognized and adjusted by the regulation of the injection profile, wherein the control intervention is stored as a pre-control value. If such or similar variation occurs a second time, for [sic] the control intervention can be traced back to the stored pre-control value. In case of a deviation in the charge pressure, for example, in unsteady operation, the deviation produced from the charge pressure deviation in the combustion point is adjusted and stored in a pre-control characteristic map as a function of, in particular, the magnitude of the charge pressure deviation. If this or a similar charge pressure deviation occurs another time, the adjusting control deviation of the 50% mass conversion point due to the adapted pre-control characteristic map is advantageously set smaller from the start.

An adaptation of pre-control values is performed, in particular, step by step. For example, an adaptation is performed successively during operation starting from a first phase of a startup of an internal combustion engine. Advantageously, after a learning time, a regulation is improved in a wide range of unsteady work points.

For generating pre-control values, for example, internal combustion engines of pre-production vehicles are equipped with pressure sensors and pre-control values are obtained from continuous running under varying operating conditions. Accordingly, pre-control values can also be obtained from a test bench operation. Advantageously, these determined values are used in subsequently produced production vehicles. For example, a pressure sensor can be eliminated in a production vehicle.

In one construction it is provided that cylinder pressure monitoring is performed, in order to obtain by means of this monitoring at least one first parameter, which is used in regulation, and that a change in the injection profile is generated. With cylinder pressure monitoring, in particular, parameters are selected from the group comprising maximum pressure, average pressure, maximum pressure rise, balance point of the pressure with respect to the crankshaft angle, inflection point with respect to the crankshaft angle, and pressure rise as a result of the start of the combustion.

A balance point of combustion in the first and subsequent cycles is shifted and stabilized according to one refinement toward a "retarded" position by a change in the injection profile. For this purpose, for example, a main injection is shifted in the "retarded" direction. In particular, for preventing short-term increased combustion noises, one or more pre-injections are activated, in order to limit a pressure rise. Advantageously, the tendency toward shutting down can be reduced and the combustion can be stabilized through one or more pre-injections. Instead of separate pre-injection and main-injection pulses, a continuous injection can be used, in particular, under use of an injection rate profile rising after the start of ignition.

In one variant, the regulation changes the injection profile for a shifting process of a gear unit coupled with the internal combustion engine. For example, a start and/or an end of a main injection and/or a pre-injection or post-injection are adapted for achieving a harmonic torque buildup during unsteady engine operation during shifting. In particular, for an unsteady engine operation, which can often lead to high exhaust-gas recirculation rates with too much delay of the combustion, a disharmonic instantaneous buildup is curtailed. In addition, hydrocarbon rates are advantageously reduced.

The invention further relates to a direct-injection internal combustion engine of a vehicle with at least one injection device for the injection of fuel into a corresponding combustion chamber of the vehicle, with a control unit for regulating the injection, with at least one sensor, which is allocated to a combustion chamber and which records a first parameter coupled with a combustion profile in the combustion chamber, wherein the sensor is connected to the control unit, wherein the injection device, the control unit, and the sensor each have reaction times that are short enough that their sum is less than a time period of a first work cycle, advantageously a combustion cycle, in which the control unit performs a regulation of one injection profile, based on at least the first parameter recorded by the sensor.

According to one construction, this ratio of the sum of reaction times to the time period of the work cycle is present over the entire operating range of the internal combustion engine. According to another construction, this condition is present in only one or several operating ranges of the internal combustion engine. In addition, there is the possibility that a reaction time of at least one of the components to be monitored is changed. Thus, due to this change, in the same operating range, the condition can be satisfied once and not satisfied another time. Advantageously, the reaction time is changed when an otherwise too high load is set, for example, for one of the components or also in the scope of data transmission or data processing.

One refinement provides that the internal combustion engine, advantageously a direct-injection internal combustion engine of a vehicle, is provided with at least one injection device for injecting fuel, in particular, into a corresponding combustion chamber of the vehicle, with at least one control unit and with at least one sensor, which records the first parameter during a first combustion cycle, and the first parameter is coupled with a profile, advantageously a combustion profile in the combustion chamber, wherein the sensor is connected to the control unit, in order to make this recorded ACTUAL data available to the control unit. The control unit has a comparison unit, by means of which a comparison of the ACTUAL data with DESIRED data is performed, and the control unit has an adjustment device, which is coupled with at least the injection device in the scope of a closed-loop regulation, in order to perform, as a function of the result of the comparison, an adjustment of the ACTUAL data to the desired data within the first combustion cycle.

According to one construction, at least one sensor is used, which is a continuously operated sensor for recording a parameter profile. Advantageously, all of the sensors for recording the first parameter are operated continuously over a combustion profile. According to one refinement, at least one, in particular, all of the sensors are used as clocked sensors, which advantageously record discrete parameter values. They can also record only sections of a desired profile.

As the injection device in the internal combustion engine advantageously operating according to the Otto or diesel principle, in particular, a high-pressure injector is used. The injection device here operates advantageously with pressures of at least 1 kbar, advantageously at least 1.5 kbar. The injection device advantageously operates according to the "common rail" principle. A reaction time of a control valve advantageously lies below 0.2 ms for the time requirement between the control start up to the opening. In connection with inertia of a nozzle needle, advantageously dead times below 0.6 ms and preferably below 0.2 ms are achieved. Advantageously, injectors are used that operate according to the piezoelectric principle. Thus, the reaction times of the injection device lie significantly below the time requirements of 20 ms of a complete revolution of the crankshaft at a rotational speed of 3000 rpm, which is mentioned here as an example. In particular, the reaction time also lies significantly below the time period of a combustion process, for example, at 8 ms in the present example of 3000 rpm. In addition, the reaction times of the injection device advantageously also lie significantly below the used injection periods of, for example, approximately 0.5 to 3 ms.

As the sensor, advantageously a sensor is used that touches upon the piezoelectric principle. With this sensor, advantageously a pressure in the combustion chamber is measured. In particular, however, in connection with other sensors, measurement of other parameters of the combustion can be provided. For example, an optical sensor can be used for measuring a combustion intensity. Furthermore, an ionic current sensor can be used, which measures an ionic current that can be brought into association with a combustion process. In particular, different sensors can be used, which deliver information items that supplement each other. Various principles, such as, for example, a pressure measurement, can take place, in principle, and, for example, a pressure measurement device can be integrated advantageously in a spark plug emerging, for example, from EP 1 637 806 A1, US 2005 252297, EP 1 519 175. In this respect, these publications are referenced in the scope of the disclosure.

The parameter is advantageously selected from the group comprising average combustion chamber pressure, average combustion pressure, start of the combustion process, pressure rise due to the combustion start, balance point of pressure, peak value of pressure, rate of change of the pressure, and inflection point in the pressure profile.

The combustion chamber of the vehicle is constructed, in particular, such that it contributes to a homogenization of the charge. The inlet system and the cavity surface of the piston are advantageously constructed in such a way that the charge tumbles or twists.

The control unit advantageously has cycle times below 0.2 ms, which is guaranteed, for example, through a correspondingly high clocking of a microprocessor. As output parameters, the control unit has, for example, a voltage output for controlling an end stage of the injector device. As an input signal, in particular, the parameter recorded by the sensor is used. In addition, at least one other parameter can be provided, which can be selected from the group comprising charge pressure, intake pipe temperature, injection quantity, injection characteristic, injection start, rail pressure, angle sensor signal, operating mode, and end stage output signal. With the help of the output voltage, in particular, the injection start and injection characteristic or injection profile are controlled.

The control unit can be connected, in particular, to a storage device. In this device, for example, characteristic maps can be stored for the pre-control of certain operating states. The storage device can be arranged, for example, in a motor controller or else in the control unit itself. In addition, the control unit can be integrated into the motor controller.

According to one refinement, the control unit is connected to a monitoring of a particle filter, wherein the control unit adjusts the injection profile for regenerating the particle filter. The monitoring supplies, for example, information on a full level of the particle filter. In particular, the monitoring recognizes when a regeneration of the particle filter is required. For regeneration, the injection profile is adjusted, for example, to the extent that through at least one post-injection, a balance point of the injection rate can be set in the "retarded" direction. In particular, at least one post-injection can take place at the end of the combustion process.

In one construction it is provided that the control unit is coupled with at least one emission monitoring device, wherein the control unit adjusts the injection profile for reducing emissions. The emissions monitoring device monitors parameters from the group comprising oxygen content, hydrocarbon content, nitrogen oxide concentration, soot particle parameter, and exhaust-gas temperature. Here, for example, characteristic maps can be drawn using various injection profiles, from which favorable operating points can be selected for the emissions. In addition, advantageously a closed-loop regulation can take place, wherein the cycle time of the regulation is significantly greater than the reaction time of the injection regulation due to the dead times of the exhaust-gas system, which are greater in comparison to the combustion process. In particular, an injection regulation is provided with a short cycle time of, for example, approximately 0.2 ms, which is superimposed on an emission regulation with a greater cycle time. The cycle time of the emission-monitoring here lies, for example, in the range of approximately 1 s. In particular, it can be provided that a desired value of the injection profile regulation is set with reference to the emissions regulation.

According to one refinement, a cylinder pressure monitoring device is provided, which is coupled with the control unit. The cylinder pressure monitoring device monitors, advantageously, the pressures of the various cylinders of the internal combustion engine. In particular, the cylinder pressure monitoring device is provided to achieve uniform pressure development in each cylinder of the internal combustion engine in connection with the control unit. For example, the average and/or peak pressure in each cylinder is set by means of the control unit, so that these are approximately identical. In a first variant the use of a control unit and a sensor for each cylinder can be provided. In another variant the use of a common control unit for several cylinders of the internal combustion engine can be provided. In this case, the control unit has corresponding inputs for the various sensors of each cylinder. In addition, in this case the control unit has correspondingly different outputs for each injection device of the associated cylinder. In particular, the use of a combustion profile determined in a first cylinder for dimensioning an injection profile in a second cylinder can be provided.

Data transmission is advantageously performed by means of a serial data bus, wherein advantageously a data transmission rate of at least 500 kbps is provided.

According to one construction it is provided that the injection device has at least one injector, which is coupled with a piezoelectric element. The piezoelectric element is here advantageously integrated into the injector in such a way that an injection jet can be raised from the seat by means of a hydraulic pressure generated by the piezoelectric element. The piezoelectric element is here advantageously integrated into the injector in such a way that the shortest possible lines to the injection jet are realized.

According to requirements, an injection profile can be generated in any arbitrary way, for example, continuously, with variable rate, and/or through at least two separate injection events. The continuous generation can be realized, for example, with an injector, such as the CORA RS from FEV Motorentechinik GmbH, whose injection rate and also injection times can be set extremely flexibly and nevertheless precisely. More details on a possible and preferred injector, its design, and its associated injection system are to be taken from DE 100 01 828 and DE 10 2004 057 610, which, in this respect, is referenced in the scope of this disclosure. In particular, with such an injector there is the possibility to be able to react accordingly within one work cycle.

BRIEF DESCRIPTION OF THE DRAWINGS

Below, the invention will be explained in detail with reference to the drawings. The constructions shown there, however, are not to be considered limiting or limited to the individual drawing. Instead, respective features described in the description, including the description of the figures, and also shown in the figures can be combined with each other to form refinements.

Shown are.

DETAILED DESCRIPTION OF THE INVENTION

Figure 1:
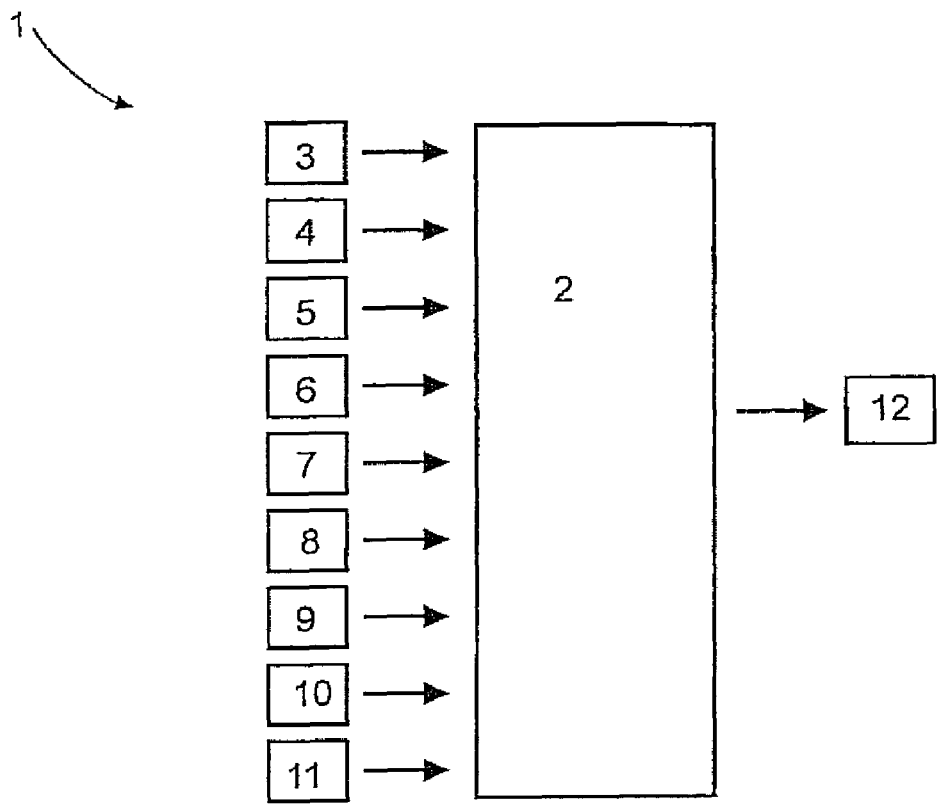
FIG. 1, a first signal flow diagram,
FIG. 2, a second signal flow diagram,
FIG. 3, a third signal flow diagram,
FIG. 4, a first injection characteristic,
FIG. 5, a second injection characteristic,
FIG. 6, a third injection characteristic,
FIG. 7, a fourth injection characteristic,
FIG. 8, a fourth signal flow diagram,
FIG. 9, a representation of an example control sequence,
FIG. 10, a representation of a cylinder pressure profile, an injection pressure, a needle lift of an injection device, and a ? plotted above the crank angle,
FIG. 11, a schematic representation of a control of a start rate as a function of a load and a pressure rise, and
FIG. 12, a schematic representation of a control of an injection rate rise of a residual quantity at the combustion start.

FIG. 1 shows a first signal flow diagram 1. A control unit 2 has various inputs, which are not shown in detail and which are provided for the input of a pressure profile 3, an end-stage output 4, a charge pressure 5, an intake pipe temperature 6, an injection quantity 7, an injection characteristic 8, an injection start 9, a rail pressure 10, and also an angle sensor signal 11. From these input values, the control unit 2 calculates a control signal 12, which is provided for controlling an output voltage of an end stage of an injector control.

The core of the control unit 2 is a microprocessor, which can perform a corresponding regulation with reference to control instructions contained in a not-shown storage device.

As a reference point for the pressure profile, advantageously a crankshaft angle is used. This is transmitted to the control unit 2, for example, with the angle sensor. In another construction, it can also be provided, alternatively or additionally, to select time as a reference for a profile.

The first signal flow diagram 1 is used for a regulation of an injection profile. The desired injection quantity 7 and desired injection start 9 are selected, for example, from a not-shown characteristic map according to a similarly not-shown driver request.

By means of the input parameter, injection characteristic 8, whether several injection pulses or else a continuous injection profile is to be involved, for example, is set. In particular, the injection characteristic can be selected from various classes of injection profiles.

Below, elements with identical actions are provided with identical reference symbols.

Figure 2:
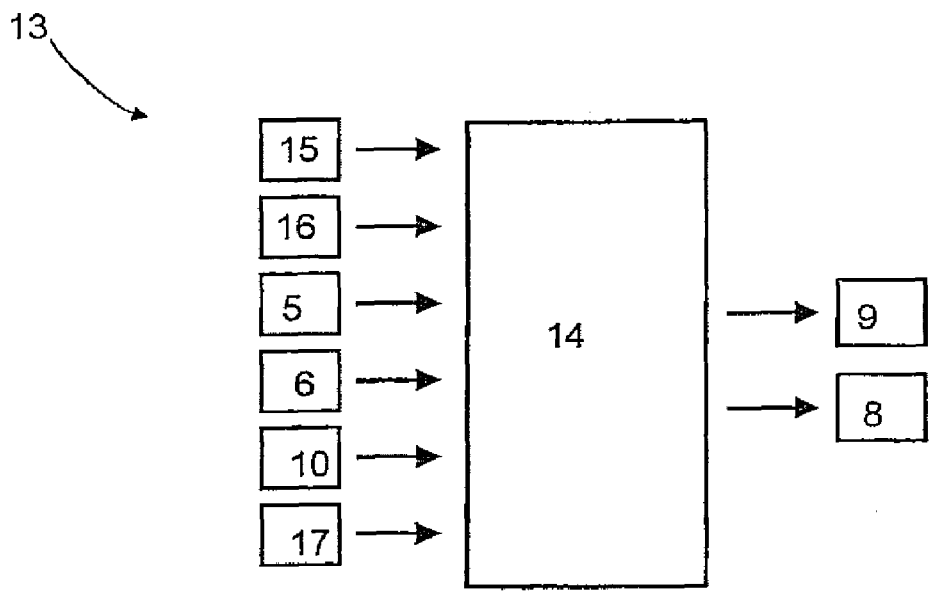

FIG. 2 shows a second signal flow diagram 13. This is based on a closed-loop control of an injection start. A series of input parameters, which are, in detail, a 50% mass conversion point 15, a lambda value 16, which is determined in an intake pipe, a charge pressure 5, an intake pipe temperature 6, a rail pressure 10, and an operating mode 17, is fed to a second control unit 14. The 50% mass conversion point 15 is determined, for example, with the help of the sensor, which records the combustion chamber pressure, in connection with the crankshaft rotational angle sensor. By means of the operating mode, for example, the state in which the combustion engine will be operated can be preselected. For example, the combustion engine can be operated in a regeneration mode for a diesel soot particle filter. In addition, a rich or a lean combustion can be provided as the operating mode, for example. A default setting of an operating mode is realized, for example, with reference to a characteristic map or with reference to a driver request.

As output parameters, the second control unit 14 calculates an injection start 9 and also an injection characteristic 8. These two output parameters can be fed, for example, into the first control unit 2 from the first signal flow diagram. The injection characteristic is advantageously adapted to the operating mode. For example, for combustion at a high-load operating point, it is provided to increase the injection rate at the combustion start in the direct connection to a start injection and to allow the injection to end abruptly. For an unsteady engine operation with short-term high exhaust-gas recirculation rates, it can be provided, in contrast, to shift a main injection in the retarded direction and optionally to also provide a pre-injection. In addition, one or more post-injections can be provided for example, in a regeneration operating mode for a diesel soot particle filter.

Figure 3:
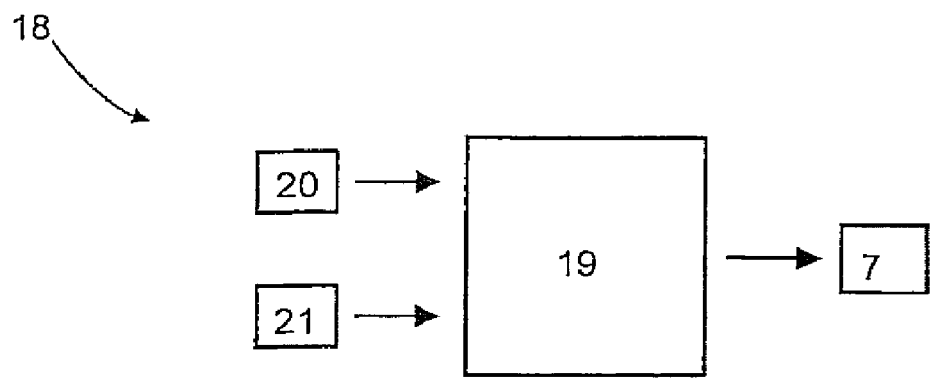

FIG. 3 shows a third signal flaw diagram 18, which is based on a regulation of an injection quantity. This regulation also involves a closed-loop control. An average combustion chamber pressure 20 and also a driver request 21 are fed as input parameters to a third control unit 19. The driver request 21 is determined, for example, from a gas-pedal position or a gas-pedal acceleration. In particular, a selected gear of a transmission is taken into account for the determination of the driver request. As an output parameter, the third control unit 19 calculates an injection quantity 7. This can be fed, for example, to the first control unit 2 according to the first signal flow diagram 1. For determining the injection quantity, it is advantageously taken into account that a different average cylinder pressure is set according to each operating state, in particular, according to each exhaust-gas recirculation rate or charge pressure, as a function of the injection quantity. Additionally or alternatively, various set cylinder pressures can also be taken into account. Preferably, with regulation of an injection quantity, the average cylinder pressure can be set to a desired value despite a variation in other operating parameters, such as, for example, the exhaust-gas recirculation rate or the charge pressure.

The control units 1, 14, 19 described above are each allocated to a combustion chamber or a cylinder. Accordingly, the control signal 12 is provided for controlling an injector allocated to each cylinder. In another variant, the input parameters allocated to each cylinder can be provided for each cylinder separately as input parameters to a common control unit. The other input parameters, which do not differ for a regulation of an injection supply to each combustion chamber or cylinder, are advantageously provided only once as an input parameter to the common control unit. The parameters that are common for the regulation of all cylinders are, in particular, rail pressure, charge pressure, intake pipe temperature, lambda value, and also operating mode. Accordingly, in the not-shown common control unit for each cylinder, a control signal can be provided separately. Advantageously, with the use of the common control unit, it is provided that at least one control signal generated for at least one cylinder be used for a pre-control of a regulation of at least one other cylinder.

Figure 4:
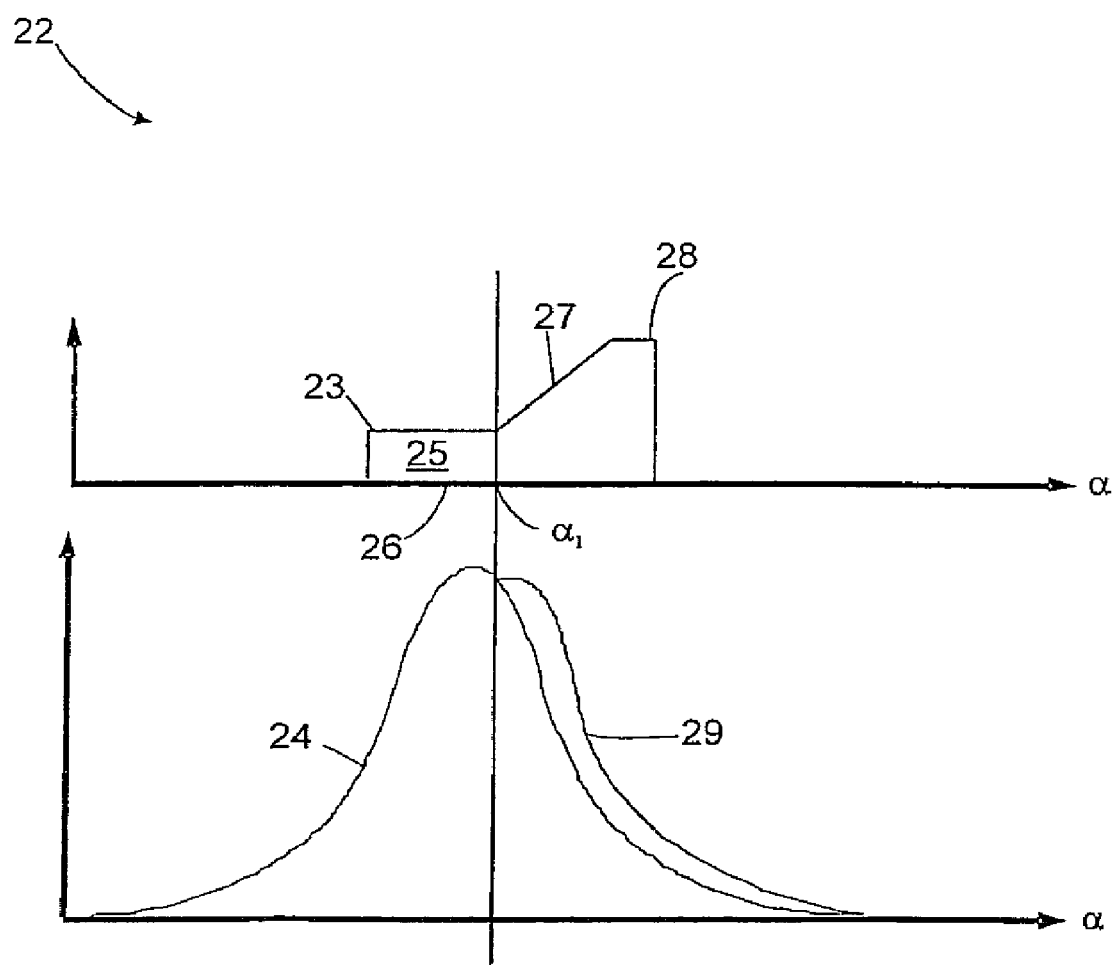

FIG. 4 shows a first injection characteristic 22. Shown are an injection rate profile 23 over a crankshaft angle α and also a pressure profile 24 over the crankshaft angle α. At the start of the injection, a start injection 25 is provided, which has a constant injection rate over a first crankshaft angle section 26. At the start of combustion at the crankshaft angle $\alpha_1$, the constant rate changes to a rising rate ramp 27. At the end of the injection, the injection rate is maintained at a constant level 28 for a short time, in order to then drop abruptly to zero.

The increase in the injection rate at the combustion start advantageously increases turbulence in the combustion chamber. The abrupt injection end advantageously has the effect that good prerequisites for post-oxidation are provided due to a hot combustion end.

The injection rate profile 23 corresponds to the pressure profile 24. Due to the rising rate ramp 27, however, the pressure profile 24 continues into a second pressure profile 29. This second pressure profile 29 is shifted relative to the first pressure profile 24 in the "retarded" direction.

Figure 5:
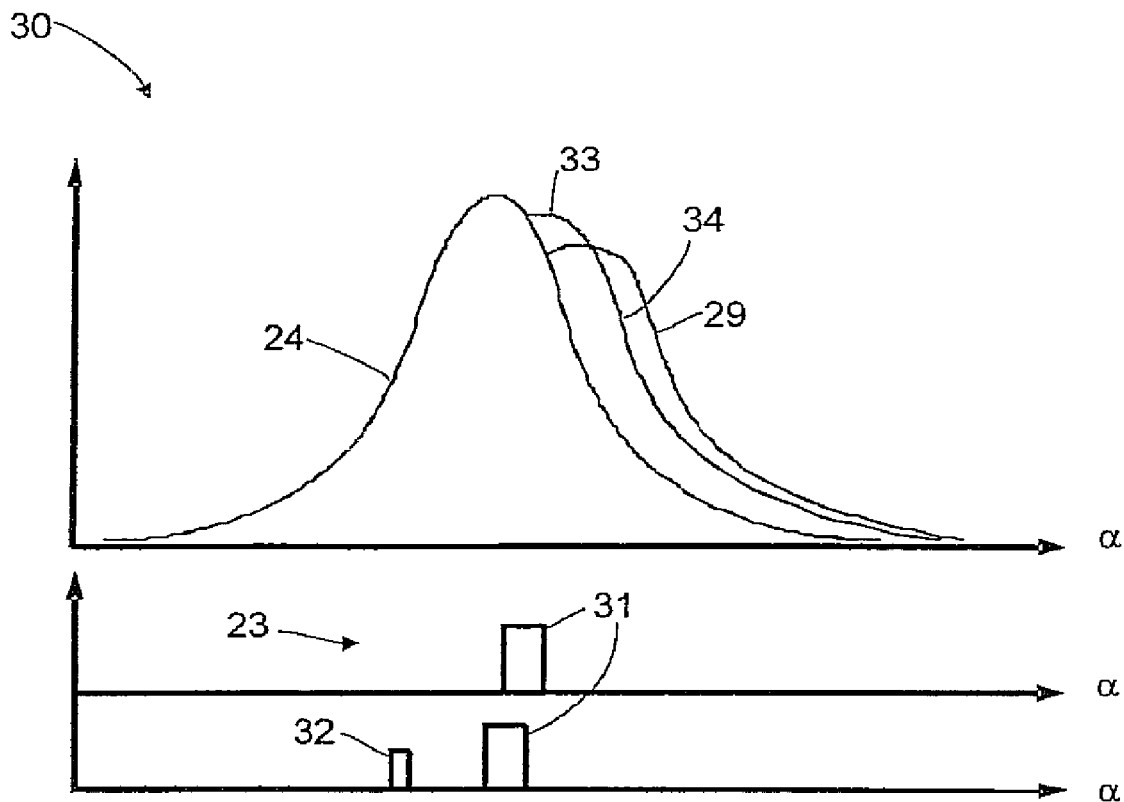

FIG. 5 shows a second injection characteristic 30. Shown are, in turn, a pressure profile 24 and also an injection rate profile 23. For preventing shutdown and for stabilizing the combustion in connection with a shift of a main injection 31 in the retarded direction, a pre-injection 32 is provided. The unsteady engine mode can lead to strong protraction of the combustion for short-term exhaust-gas recirculation rates that are too high, which can lead, in particular, to very high hydrocarbon rates and also to disharmonic torque buildup. This makes itself known in a significant deviation of the pressure profile from a desired pressure profile 33. In detail, a second pressure profile 29 is shifted significantly in the "retarded" direction. As an aid, a main injection 31 is shifted in the "advanced" direction, wherein, in particular, to avoid shutdown and to stabilize the combustion, one or more pre-injections 32 are activated in an unsteady way. Thus, a corrected pressure profile 34 is produced.

Figure 6:
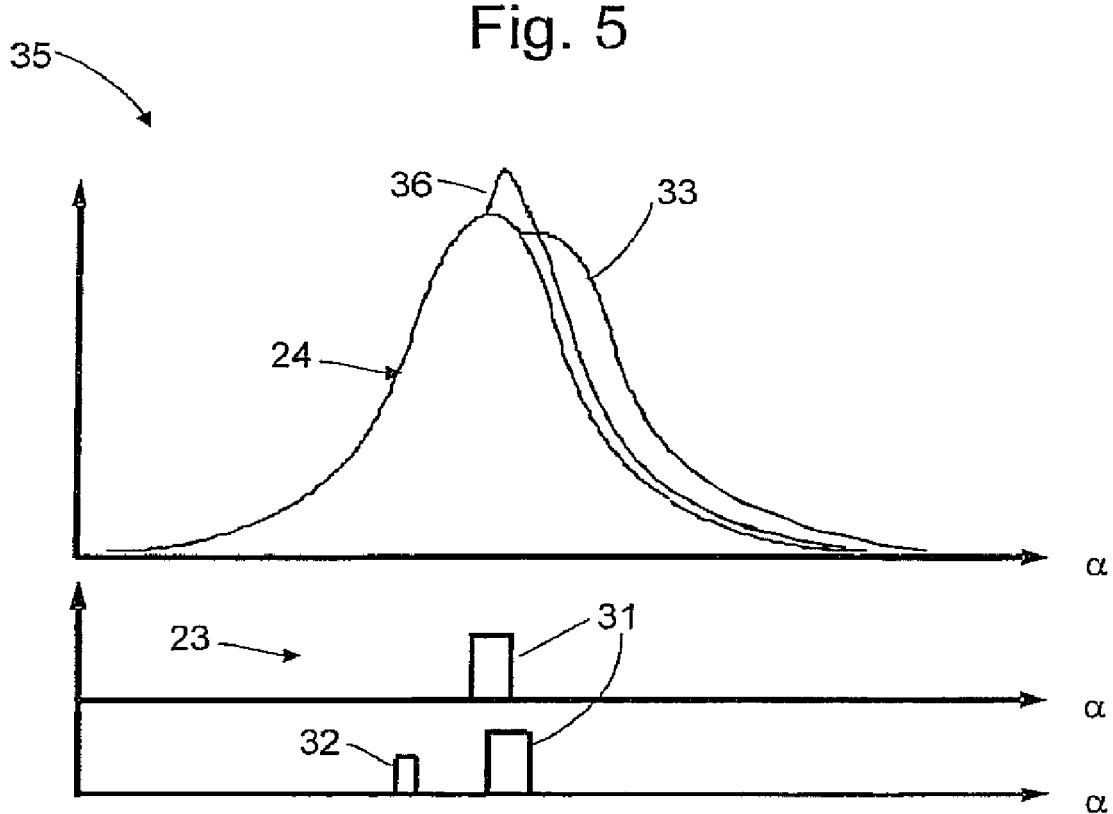

FIG. 6 shows a third injection characteristic 35. Shown are, in turn, a pressure profile 24 and also an injection rate profile 23. An unsteady engine mode with short-term exhaust-gas recirculation rates that are too low can lead to a steep pressure rise 36, which makes itself known in a significant deviation from a desired profile 33. As a remedy for preventing short-term, elevated combustion noise, one or more pre-injections are activated, in order to limit the pressure increase, in addition to a shifting of a main injection 31 in the retarded direction.

Figure 7:
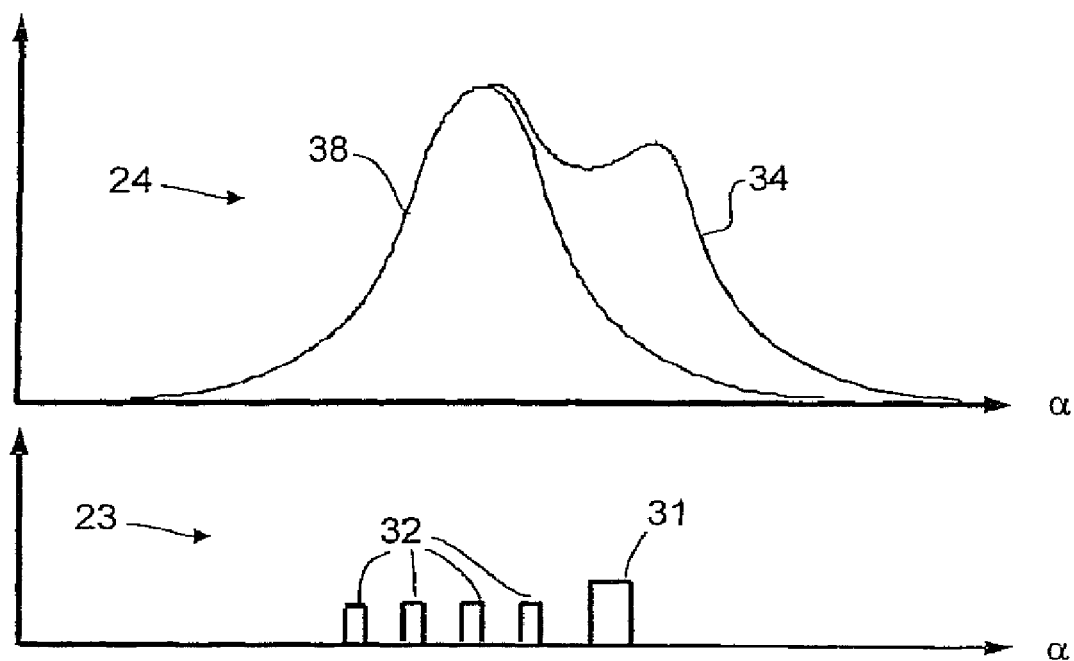

FIG. 7 shows a fourth injection characteristic 37. This provided, for example, for stabilizing very retarded main injections, in particular, at operating points of very small loads or for a regeneration mode of a diesel soot particle filter. Shown are, in turn, a pressure profile 24 and also an injection rate profile 23 as a function of the crankshaft angle α. For a favorable quantity regulation for homogeneous torque buildup, several pre-injections 32 and also a main injection 31 shifted significantly in the retarded direction are provided. Thus, a corrected pressure profile 34, which is shifted significantly in the "retarded" direction relative to a conventional pressure profile 38, is produced. Accordingly, a 50% mass conversion point not shown in detail is displaced significantly in the "retarded" direction.

Figure 8:
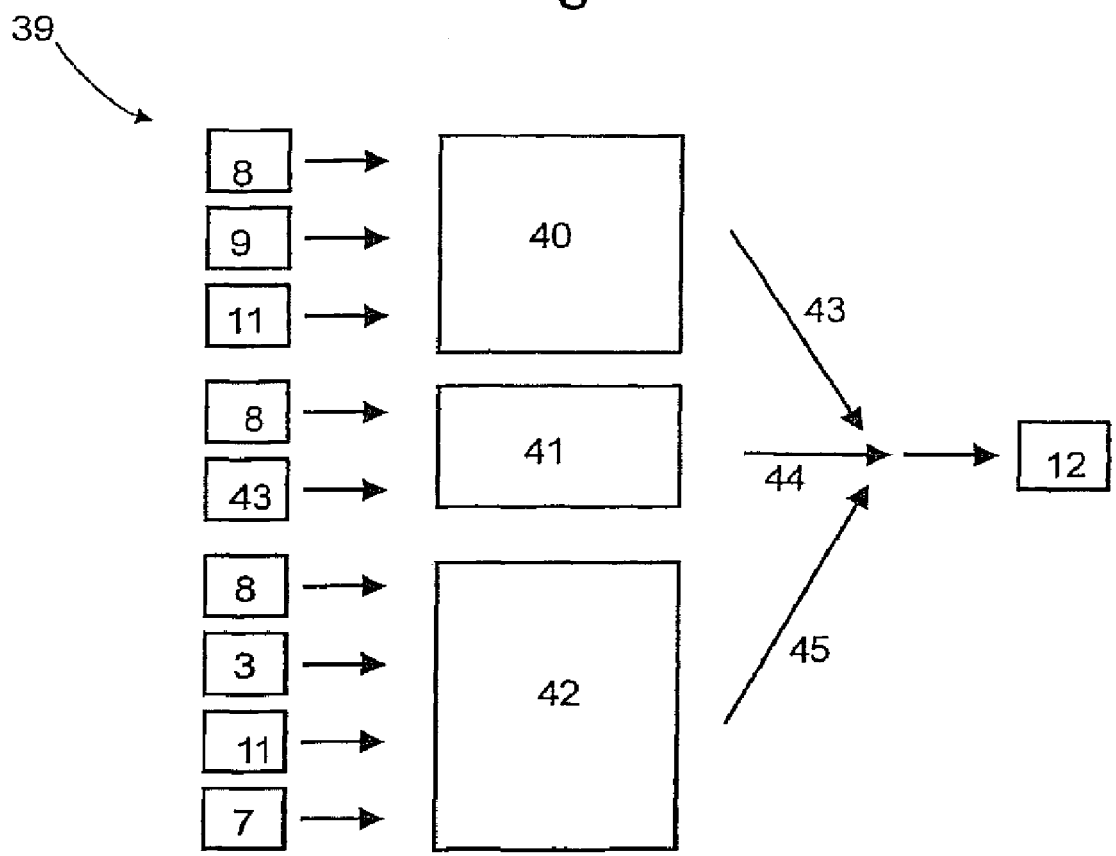

Finally, FIG. 8 shows a fourth signal flow diagram 39. This is based on a control-loop control of an injection rate. In detail, a fourth, fifth, and sixth control unit 40, 41, 42 are provided. The fourth control unit 40 is used for calculating a start point of the injection. The fifth control unit 41 is used for calculating a start of the injection rate change. The sixth control unit 42 is used for calculating the injection end with reference to a comparison of the integrated end stage output with the desired fuel quantity. The respective output signals 43, 44, 45 are linked together to form a total control signal 12, which is used for controlling an injection device. The fourth control unit 40 is based on an injection characteristic 8, an injection start 9, and also an angle sensor signal 11 as input parameters.

An injection characteristic 8 and also a combustion start 43 are fed to the fifth control unit 41. The combustion start is determined, for example, by means of a pressure sensor from a pressure rise in a combustion chamber.

In an injection characteristic 8, an end stage output signal 3, an angle sensor signal 11, and also an injection quantity 7 are fed as input parameters to the sixth control unit 42. The injection quantity 7 can be provided, for example, by means of the third control unit according to the third signal flow diagram. Accordingly, the injection start 9 and also the injection characteristic 8 can be provided by the second control unit according to the second signal flow diagram.

Figure 9:
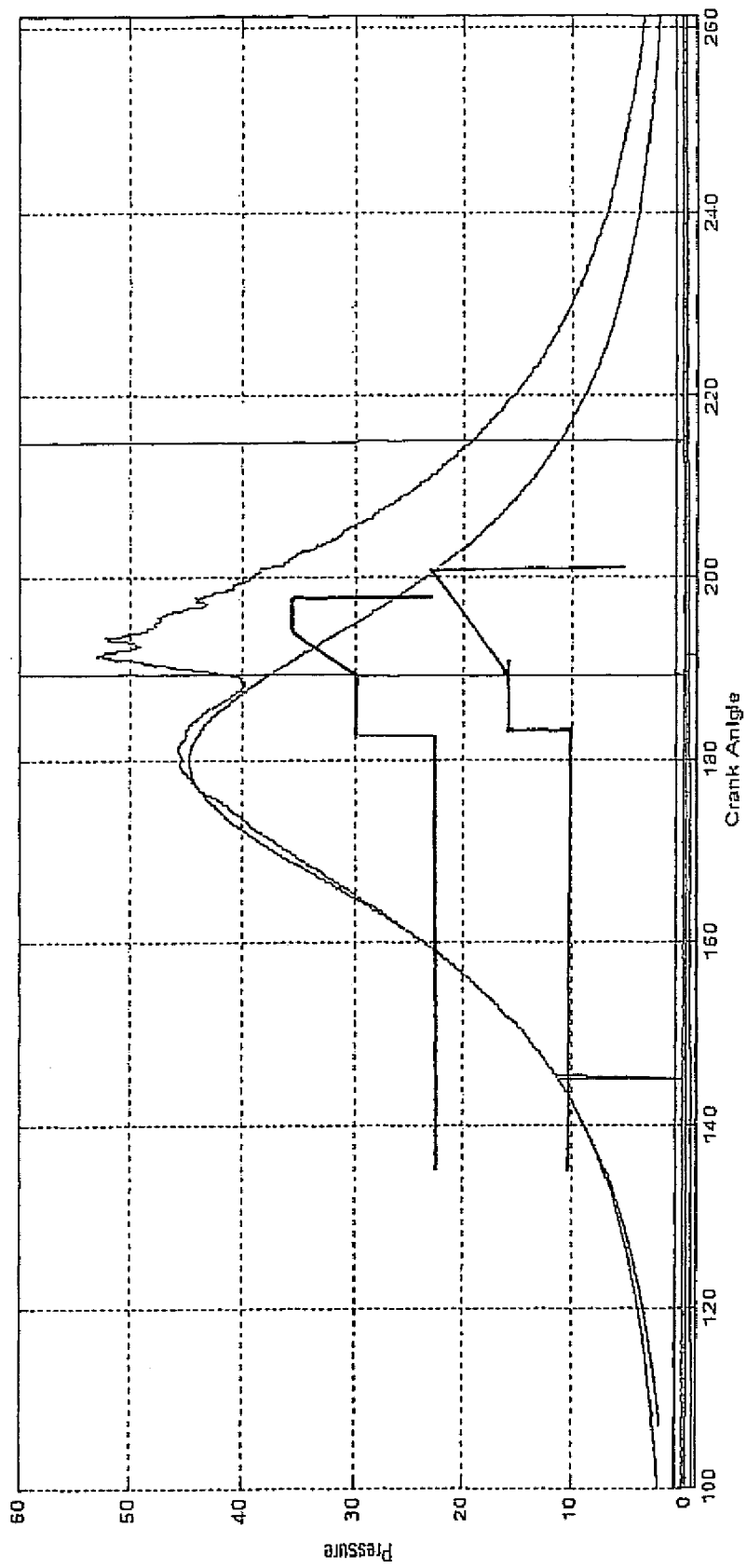

FIG. 9 shows a representation of an example control sequence by changing an injection characteristic. This measurement plot shows the pressure profile in a cylinder at 2000 rpm, wherein one curve is produced without control intervention, while the other shows a shift in the "retarded" direction with an additional pressure rise and therefore resulting shift in balance point with respect to combustion due to the control intervention. This stabilization of a very retarded main injection at a small load is achieved by a pre-injection, which has a ramp-like profile at a first plateau. This plateau level is maintained before a main injection starts with a corresponding increase starting from the achieved plateau level. For better clarity, two different injection profiles are drawn in the measurement plot. While the upper profile of the injection reproduces the actual profile, the profile arranged underneath shows another, especially preferred construction of the profile. While a first and a second plateau are to be seen in the upper profile, the lower profile has only one plateau, from which an increase in the injection rate up to approximately the end of the injection follows. It has proven advantageous if the injection rate, in the scope of regulation, is variably adapted to the situation in the cylinder. Here, in particular, the increase in the injection rate can be adapted. The present regulation allows that within a time period of less than 15 μS, a change in the injection rate is realized. In particular, the measurement plot shows that the regulation is in the position, after exceeding a first pressure maximum, of being able to lead the pressure to another, in particular, greater maximum by means of the regulated injection profile. A change in the injection rate is realized advantageously in a crankshaft range between 170°KW and 210°KW. If a second ramp, i.e., a second increase in the injection rate profile is provided, then this is arranged in an operating range advantageously up to 3000 rpm in a range between 180°KW and 205°KW.

Figure 10:
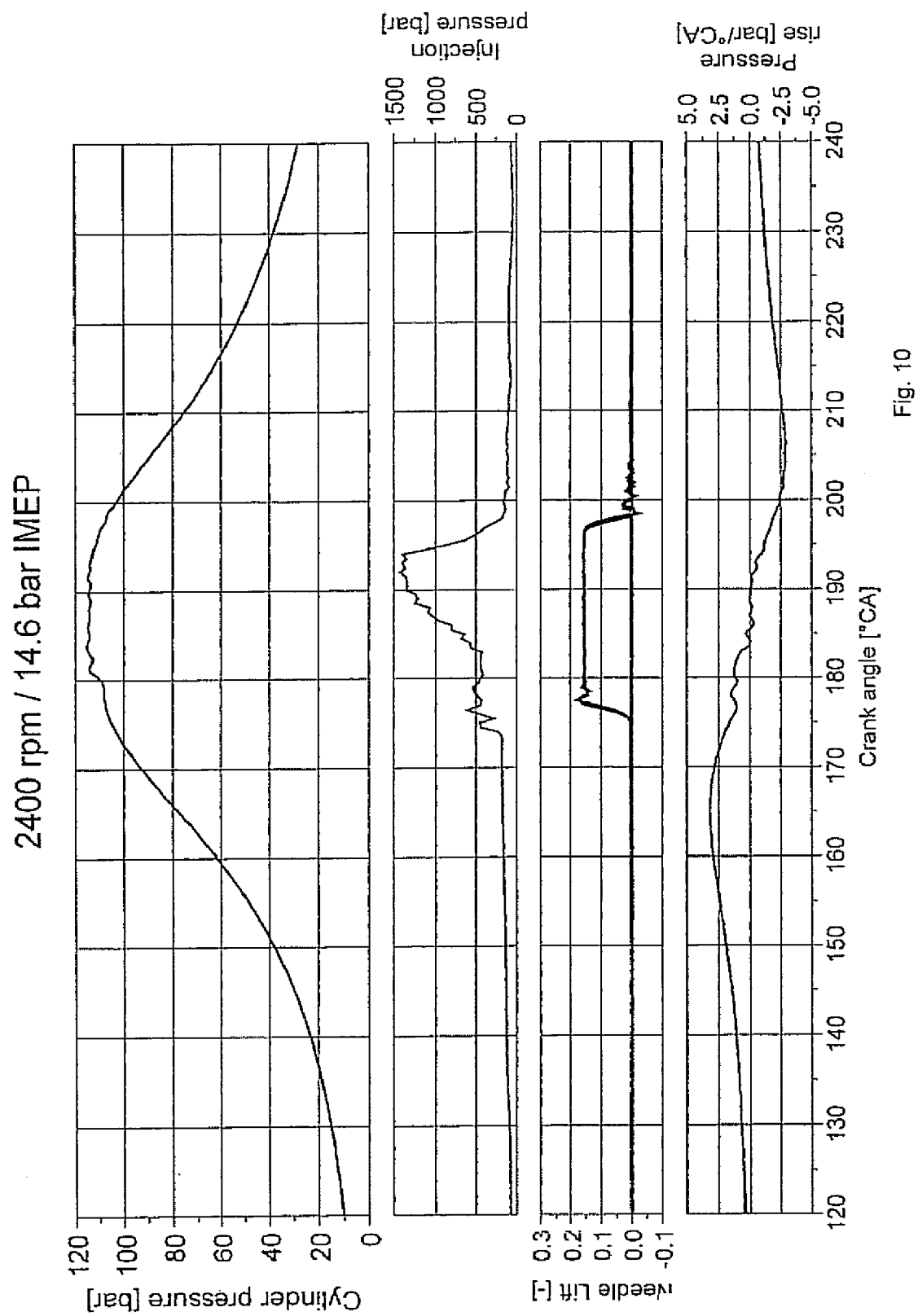

FIG. 10 shows a representation of a cylinder pressure profile, an injection pressure, a needle lift of an injection device, and a relative pressure change recorded over the crankshaft angle. The measurement curves were recorded at 2400 rpm, at an indicated average pressure of 14.6 bar. The regulation allows the injection pressure to be set so that an increase with reaching a first level and a subsequent second increase are realized, which changes to an approximately uniform level before a drop then occurs. A needle lift is held approximately constant according to this construction, so that, in particular, an available outlet opening region is used approximately completely over approximately the entire injection profile. Thus, a mass flow to be injected is fundamentally influenced by means of the regulation of the pressure profile. As also to be taken from the measurement plot, the injection can take place, in particular, so that the pressure rises as shown in the cylinder approximately consistently up to the inflection point and then falls consistently. This uniform pressure increase allows an improvement in the noise emissions, because abrupt changes are avoided, which, in turn, denote interference and noise generation points. Incidentally, tracking the pressure profile allows the possibility of being able to detect a start of a combustion, and especially also allowing generation of information on the combustion itself, for example, with respect to its quality and especially with respect to its matching with a given desired combustion. Advantageously, the adaptation and regulation allow $NO_x$ raw emissions to be reduced by approximately ⅔ without exhaust-gas recirculation in comparison to previous conventional standard combustion methods. If exhaust-gas recirculation is used, this can also enter into the regulation. Advantageously, through a presetting, a recirculated rate can be taken into account in an adapted way.

Figure 11:
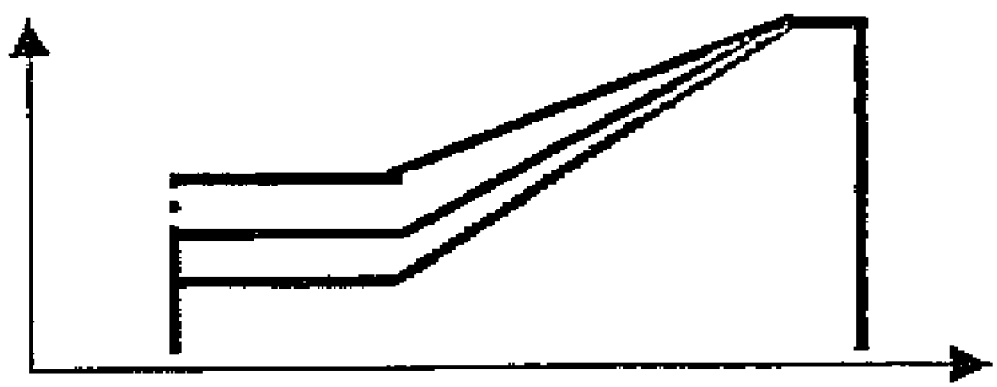

FIG. 11 shows a schematic representation of a regulation, advantageously of an initial rate as a function of a load and a pressure rise. Along the Y-axis is the injection rate; the X-axis indicates the time profile. According to what load is applied and how a pressure rise develops in a cylinder, the regulation can intervene as a function of this in the same or at least in the next cycle and can set, in particular, a preset injection rate to a desired value. This can mean, as shown, that the initial rate is lowered or increased. In another construction, it can be provided that different rates are set at different level plateaus for each cylinder. As a function of the resulting actual rate increase at the start of the injection, the residual quantity of the fuel to be injected is injected in a widely distributed way according to adaptation. Here, an adaptation of an injection rate increase can be advantageous, as shown, for example, with several increases to a highest plateau in the injection rate. In addition to the increase, based on the regulation, the time point of setting an increased injection rate can also be shifted in the advanced and also retarded directions individually according to cylinder.

Figure 12:

FIG. 12 shows a schematic representation of an example regulation of an injection rate increase as a function of a residual quantity, which is advantageously set at the combustion start. Along the Y-axis is the injection rate; the X-axis indicates the time profile. The residual quantity can also, in particular, change, because a change in the injection quantity can also be set during the combustion profile, in particular, compared with an injection quantity at the start, due to the quickness of the regulation. Due to the change in the residual quantity, an increase in an injection rate can change, either decrease or increase. Therefore, a plateau at a higher level can still be formed, as indicated with dashed lines. The higher plateau, however, can also be eliminated, as indicated for a lower rise. In particular, an injection rate can also change in its maximum height. This means that, for example, an end value of an injection rate can change upward and also downward. Therefore, a level of a plateau of an injection rate can also be changed.

In addition to the example representations of different possibilities for regulation for adapting an injection to a corresponding state with respect to a cylinder, other injection rate profiles can also be provided, which are not shown. These can include, for example, one or more different fall rates, several plateaus of different heights, and/or injection rate profiles without plateaus.

A further development provides that an isobaric combustion can be regulated. In particular, it can be provided that for an Otto engine, an isobaric combustion can be regulated at least partially for an isochoric combustion. In particular, for an internal combustion engine according to the diesel or Seilinger process, an isobaric combustion is at least approximately regulated. Here, according to one construction, an injection start and an initial rate of the injection are regulated as a function of the corresponding cylinder pressure profile.

What is claimed:

1. A method for regulating an injection rate profile of a direct injection internal combustion engine of a vehicle comprising the steps of:
   injecting fuel directly into a combustion chamber of the internal combustion engine,
   regulating a change in the injection rate profile at least during a first work cycle on the basis of at least one parameter recorded during the first work cycle, and
   determining said at least one parameter from at least the pressure profile in the combustion chamber.

2. Method according to claim 1, characterized in that the parameter is coupled with a combustion profile which is determined during the first work cycle.

3. Method according to claim 1, characterized in that a main injection (31) in the first work cycle is changed as a function of the parameter recorded during the first work cycle.

4. Method according to claim 1, characterized in that a post-injection in the first work cycle is changed as a function of the parameter recorded during the first work cycle.

5. Method according to claim 1, characterized in that an injection quantity regulation is performed during the first work cycle, which is at least based on at least the parameter recorded in the first work cycle, wherein said injection quantity regulation is triggered by this parameter.

6. Method according to claim 1, characterized in that at least one injection profile (23) of a subsequent work cycle is changed on the basis of the determined parameter from the first work cycle.

7. Method according to claim 1, characterized in that the regulation changes the injection profile (23) in the first and in a directly subsequent second work cycle.

8. Method according to claim 1, characterized in that at least one control signal generated for at least one first cylinder is used for a pre-control of a regulation of an injection profile of at least one second cylinder.

9. Method according to claim 1, characterized in that an adaptive regulation is used as a pre-control, in order to achieve a change in the injection profile.

10. Method according to claim 1, characterized in that a cylinder pressure monitoring is realized in order to thereby obtain at least one first parameter, which is used in the regulation, and a change in the injection profile (23) is generated.

11. Method according to claim 1, characterized in that a balance point in the combustion is shifted in the first and a subsequent work cycle in a retarded direction by a change in the injection profile (23) and wherein said balance point is stabilized.

12. Method according to claim 1, characterized in that for a shifting process of a transmission coupled with the internal combustion engine, the regulation performs a change in the injection profile (23).

13. A direct injection internal combustion engine of a vehicle comprising:
- at least one injection device for injecting fuel into a corresponding combustion chamber,
- a control unit which regulates an injection rate profile for each injection device,
- at least one sensor which records a combustion pressure profile of the combustion chamber as a parameter, said at least one sensor providing a signal to said control unit representative of said parameter,
- wherein said sensor, said injection device and said control unit each have a short reaction time such that their sum is less than a time period of a first work cycle, and
- wherein said control unit regulates the injection rate profile based on at least said parameter recorded by said sensor.

14. Internal combustion engine according to claim 13, characterized in that the control unit (2; 14; 19; 40; 41; 42) is connected to a monitoring device of a particle filter, and wherein the control unit (2; 14; 19; 40; 41; 42) adapts the injection profile for the regeneration of the particle filter.

15. Internal combustion engine according to claim 13, characterized in that the control unit (2; 14; 19; 40; 41; 42) is coupled with at least one emission monitoring device, and wherein the control unit (2; 14; 19; 40; 41; 42) adapts the injection profile (23) for reducing emissions.

16. Internal combustion engine according to claim 13, characterized in that a cylinder pressure monitoring device is provided, which is coupled with the control unit (2; 14; 19; 40; 41; 42).

17. Internal combustion engine according to claim 13, characterized in that the injection device has at least one injector, which is coupled with a piezoelement.

18. Internal combustion engine according to claim 13, characterized in that said internal combustion engine is arranged in a preproduction vehicle for determining pre-control values, which are then used in a production vehicle.

19. Internal combustion engine according to claim 13, characterized in that the internal combustion engine for a preproduction vehicle is equipped with at least one sensor, while the internal combustion engine for a production vehicle has no pressure sensor for measuring the cylinder pressure.

* * * * *